United States Patent [19]

Fukui

[11] 4,263,868
[45] Apr. 28, 1981

[54] DETECTOR FOR TOP DEAD CENTER POSITION OF A PISTON FOR AUTOMOBILE ENGINE

[76] Inventor: Kinshichi Fukui, 1424, Ryoge, Gifu City, Gifu Prefecture, Japan

[21] Appl. No.: 29,052

[22] Filed: Apr. 11, 1979

[30] Foreign Application Priority Data

Apr. 26, 1978 [JP] Japan .................................. 53/49399
Jan. 26, 1979 [JP] Japan ............................. 54/9383[U]

[51] Int. Cl.³ ........................ G01M 15/00; G08B 3/00
[52] U.S. Cl. ........................................ 116/70; 73/116; 116/280
[58] Field of Search ................. 116/28 R, 56, 58, 70, 116/67 R; 73/116

[56] References Cited

U.S. PATENT DOCUMENTS

| | | | |
|---|---|---|---|
| 777,538 | 12/1904 | Puckett | 116/70 |
| 1,535,688 | 4/1925 | Sauer | 116/70 |
| 2,098,058 | 11/1937 | Morgan | 73/116 |
| 2,698,000 | 12/1954 | Rainsbury | 116/70 X |
| 2,759,448 | 8/1956 | Pitts | 116/70 |
| 3,091,213 | 5/1963 | Maskell et al. | 116/70 |
| 3,779,081 | 12/1973 | Holtzman | 73/116 X |

*Primary Examiner*—Daniel M. Yasich
*Attorney, Agent, or Firm*—Wenderoth, Lind & Ponack

[57] ABSTRACT

The present invention is directed to a detector for detecting the top dead center position of a piston by resiliently installing a check valve within a cylinder body and having a threaded part disposed at the lower part of the cylinder body to fit a threaded hole which is for inserting an ignition plug of an engine cylinder.

For detecting the top dead center position of the piston, the foregoing threaded part is attached to the threaded hole of the automobile engine and compressed air which is produced within the cylinder by an ascent of the piston is exhausted outside the cylinder body through the check valve and, when the piston attempts to descend, airtightness is maintained within the cylinder by means of the check valve and the piston is held at the top dead center position.

3 Claims, 13 Drawing Figures

DETECTOR FOR TOP DEAD CENTER POSITION OF A PISTON FOR AUTOMOBILE ENGINE

BACKGROUND OF THE INVENTION

The inspection and adjustment of the valve clearance in an automobile is very important particularly with regard to environmental pollution which is caused by exhaust gasses. Moreover, the inspection and adjusting of the valve clearance has in the past required a considerable amount of time and labor, and has had to be performed by persons skilled in this particular area. In order to detect when the piston is at the top dead center position, a crank lever has traditionally been rotated by hand, however, since modern automobiles are in most cases equipped with a cooling pump, a power steering pump, a supercharger and the like in the engine compartment, the above-described cranking operation becomes very difficult because of the small amount of space remaining in the engine compartment. Moreover, the above-described equipment is connected to the crank shaft so that, in trying to rotate the crank shaft by hand, a great amount of force is required and frequently results in the person turning the crank injuring himself due to slipping of his hand. The disadvantages of prior art detecting methods having been described, the objects of the present invention will now be defined.

SUMMARY OF THE INVENTION

The first object of the present invention is to provide a detector which can be manufactured at a low cost, is light weight, small and of simple contruction for detecting when a piston in an automobile engine is at the top dead center position.

Another object of the present invention is to provide an instrument capable of easily detecting when the piston of an automobile engine is at the top dead center position.

A further object of the present invention is to provide an instrument which can easily perceive where the top dead center position of the piston of an automobile engine is relative to the cylinder wherein it is contained.

In the present invention the normal top dead center position is detected by a detector, for the top dead center position which has an interiorly disposed check valve which is attached to the hole for the ignition plug of the cylinder in which the top dead center position is to be detected. The piston is caused to ascend by operating a starter switch momentarily and intermittently several times so that the air compressed within the cylinder is exhausted out through a vent hole to atmosphere through an exhaust passage, so that when the piston begins to descend as a result of the inertia of the crank shaft, the check valve closes the vent hole because of the negative pressure which is produced within the cylinder by the descent of the piston, and thus, the piston is again caused to ascend by the force being generated by the negative pressure. When the piston begins to descend due to the inertia of the crank shaft, the check valve closes the vent hole to produce a negative pressure or vacuum within the cylinder due to the descent of the piston and the normal top dead center position is thus maintained by again causing the piston to ascend with the aid of the described negative pressure.

DETAILED DESCRIPTION OF THE INVENTION

The detector for top dead center position of the present invention, has an exhaust passage and a vent system which are located at the upper part and at the lower part of the cylinder body respectively and the detector also includes a threaded portion at its lower part.

Figure 1:
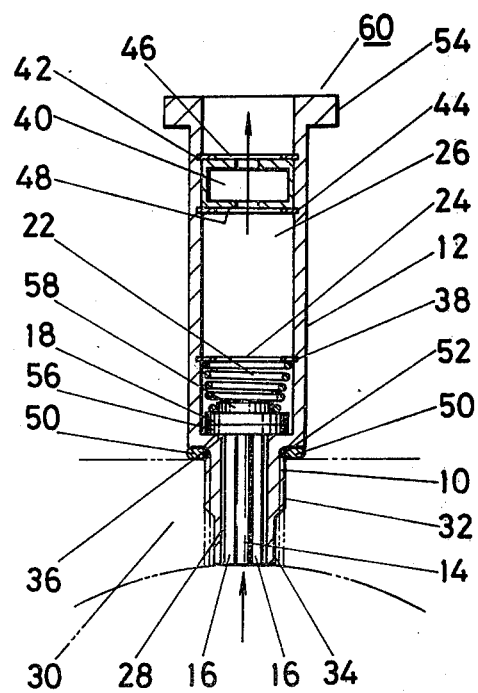
FIG. 1 is a longitudinal sectional view of a first embodiment of the present invention.

In the first embodiment, the detector for the top dead center position is, as clearly shown by the sectional drawing in FIG. 1, made-up of a cylinder body 12 having a threaded portion 10, a shaft 14 and a vent opening 16 located at the lower part of the said cylinder body and, further, has a check valve 20 which includes a valve part 18, a spring 22 and a snap ring 24 located on top of the previously described elements. The upper part of the cylinder body 12 has a large diameter and the lower part thereof is slender and constricted so that the upper part forms an exhaust passage 26 having a large diameter and the lower part serves as a vent passage 28 having a small diameter. The diameter of the vent passage 28 is slightly larger than the largest diameter of the shaft 14 so that the shaft 14 of the check valve 20 can, when being assembled, be inserted without any difficulty into the vent passage 28 from the exhaust passage 26 of the cylinder body 12. The length of the vent passage 28 is approximately the same as that of the shaft 14 of the check valve 20. The upper part of the circumference of the cylinder body 12 which is provided with the vent passage 28, includes the threaded part 10 which has a shape so that it corresponds to a threaded opening 32 which is normally used for inserting the ignition plug at the cylinder head 30. The lower part of the threaded part 10 and the relief passage 34 is located so as to allow easy attachment of the threaded part 10 to the threaded opening 32, which is used for inserting the ignition plug. At the bottom of the exhaust passage 26, within the cylinder body 12 is located a valve seat 36 above which a circular groove 38 is located in the inner wall around the circumference of the cylinder body 12 for inserting the snap ring 24 for holding and compressing the spring 22. Furthermore, at the upper part of the exhaust passage and on the wall of the inside circumference of the cylinder body 12 are disposed a pair of circular grooves 42 and 44, one above the other for supporting a whistle 40 within the exhaust passage 26, which is used to perceive when the piston is at the top dead center position by emitting a sound. The detector has an annular groove at the base above the threaded portion with a gasket 50 located therein. There is a knob 54 at the upper end of the cylinder body 12, which is used for easily inserting the device of the present invention into the threaded hole 32 which is normally used for inserting a plug. With reference to the knob 54, a knurl can be made on the side of the cylinder body 12 so that the foregoing knob 54 would be unnecessary for rotating said device since gripping the side of the said cylinder body 12 would provide enough leverage to do so when used, the said knob 54 normally has a hexagonal shape, as seen in the drawings, such as that of a bolt or a nut which can be rotated by a spanner.

The construction of the individual parts in the present invention is as described above and the assembling thereof is clearly shown in FIG. 1, that is, the shaft 14 of the check valve 20 is inserted from the exhaust passage 26 of the cylinder body 12 into the vent passage 28 which is located in the lower part. In this instance, in order to maintain airtightness, a packing 56 is inserted into the undersurface of the valve part 18 of the check valve 20 and the packing 56 is made to fit into the valve seat 36. On the upper surface of the valve part 18 of the check valve 20, the spring 22 is fitted so as to constantly press down on the check valve 20 toward the vent passage 28, however, in order to secure the spring 22, a circular projection 58 is located on the top surface of the valve part 18 and the lowest part of the spring 22 is fitted around the circumference of the foregoing projection 56 and the snap ring 24 is fitted and inserted into the circular groove 38 which is located at the lowest part of the cylinder body 12 and, at the same time, the snap ring is compressed slightly to produce a resilient action for holding the check valve 20. The detector for the top dead center position in the present invention can be completed by assembling it as described above, but, in the case where the detecting for the top dead center position is preferably done by having a sound emanate when using the detector, it becomes convenient to assemble the device as described below.

More particularly, a snap ring 48 is held within the circular groove 44 at the center of the cylinder body 12 and has the undersurface of the whistle 40 fitted on the top surface of the said snap ring 48 and, also, has another snap ring 46 fitted on the top surface of the said whistle 40. The said snap ring 46 is made so as to be inserted into the upper circular groove 42 so that the whistle 40 is disposed within the exhaust passage 26 of the cylinder body 12.

Figure 2:
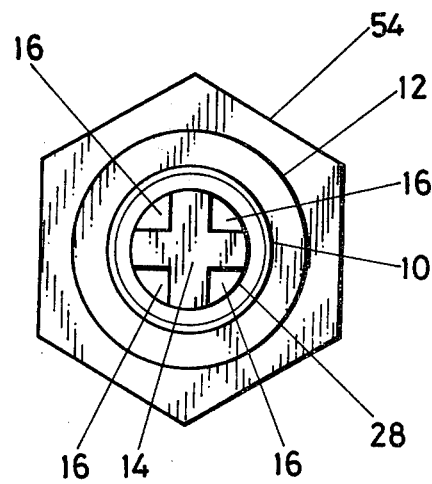
FIG. 2 is a bottom view of the embodiment of FIG. 1.
Figure 3:
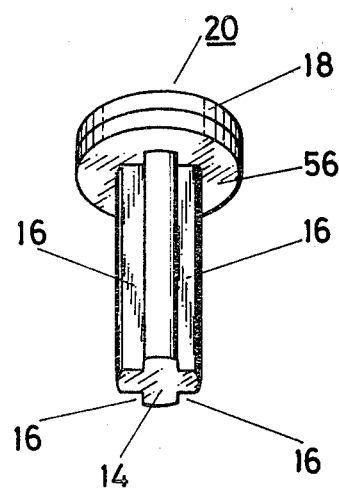
FIG. 3 is a perspective view of the check valve of the present invention.
Figure 4:
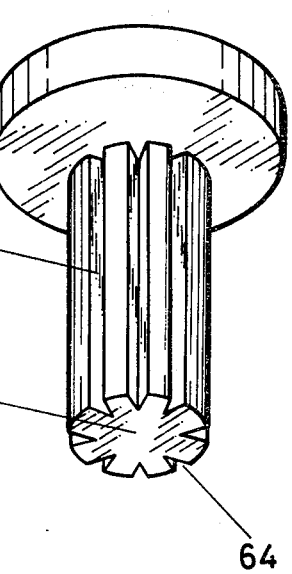
FIGS. 4 and 5 are perspective views of the check valve in other embodiments of the present invention.
Figure 5:
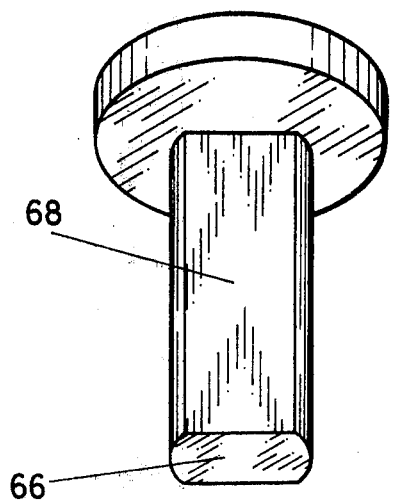

The structure of the check valve 20 in the foregoing embodiment of the present invention is not restricted to that of the above-described embodiment. The important features is the diameter of the vent passage 28 into which the shaft 14 can be inserted so that there is defined a vent passage opening 16 through which air can pass between the shaft 14 and the vent passage 28. The said vent opening 16, can be formed by a section of the shaft 14 having a cross shape as shown in FIGS. 2 and 3, or can have other shapes as shown in the other embodiments in FIGS. 4 and 5, wherein they have a sectionally V-shaped vent passage 64 which is longitudinally disposed along a shaft 62 around the circumferential surface of the said shaft 62 having a cylindrical shape (see FIG. 4), or, by cutting both ends of a cylindrically shaped material, a shaft 66 having a sectionally oval shape can be used and, finally, the vent opening is defined between both side surfaces 68 of the shaft 66 and the interior surface of the vent passage 28 when the shaft 66 is inserted into the vent passage 28 (see FIG. 5).

Figure 6:
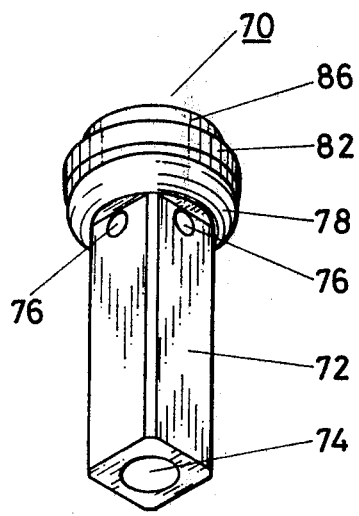
FIG. 6 is a perspective view of the check valve of the second embodiment of the present invention.
Figure 7:
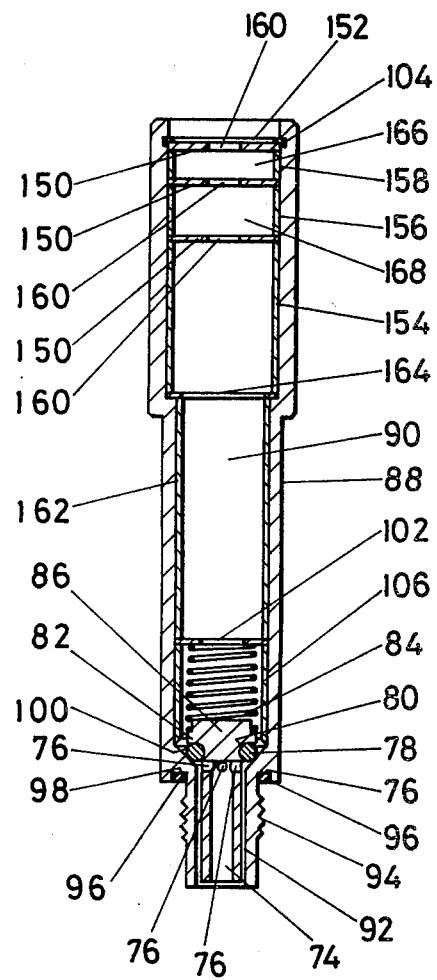
FIG. 7 is a sectional view of the second embodiment of the present invention.
Figure 8:
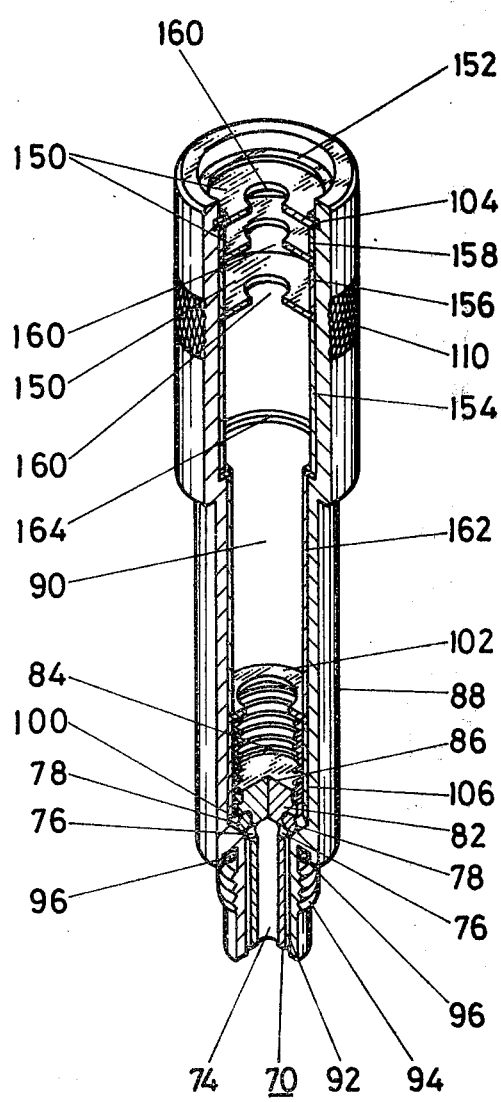
FIG. 8 is a perspective view showing a section partly broken away of the second embodiment of the present invention.

With reference to the second embodiment of the present invention which does not substantially differ from the first embodiment, there are however, some modifications in the construction of the check valve which is described below. As shown in FIGS. 6, 7 and 8, a check valve 70 in the present embodiment has four corners making up a shaft 72 which has an approximately square shaped cross-section and a vent passage 74 is formed longitudinally along the shaft 72 through the center thereof then, opens in four directions at the upper end of the vent passage 74, or more particularly, branches into vent openings 76 which open in every surface of the shaft 72 at a right angle to the vent passage 74. There is, on the upper end of the shaft 72, a circular groove 80, which has an O-ring 78 fitted therein and a valve part 82 which projects from the upper part of the circular groove 80. There is also a projection 86 located on the upper part of the valve part for supporting a spring 84. A cylinder body 88, in the present embodiment, is the same as in the first embodiment and has an exhaust opening 90 which is located at its upper part, and a vent passage 92 at its lower part. In addition, the body 88 has a threaded part 94 which is located on the upper outer circumference of the vent passage 92, with the cylinder body 88 constructed so as to be slightly thicker, the shape of an upwardly stepped part from the upper end of the threaded part 94, at the base of which a circular groove 98 is formed for attaching an O-ring 96 thereon.

At the bottom of the exhaust passage 90, there is a valve seat which has a horizontal part and a circular part which correspond to the outer circumference of the O-ring 78 of the check valve 70 and the valve seat 82. At the upper part of the exhaust passage 90, the cylinder body 88 is somewhat thicker for supporting an indicating whistle thereon, which is described later and, at the uppermost top part thereof, there is a circular groove 104 on the inside circumferential wall in which a snap ring 152 is received. There is a knurling 110 located around the upper part of cylinder body 88 for allowing easy rotation of the body 88 by hand. In the detector for the top dead center position of this embodiment, the shaft 72 of the check valve 70 is inserted from the opening of the exhaust passage 90 of the cylinder body 88 into the vent passage 92 which is located on the lower part of the said cylinder body 88. The valve part 82, to which the O-ring is attached, fits into the valve seat 100 at the bottom of the exhaust passage 90 and, further, the lower end of the spring 84 fits on the projection 86 which is disposed on the upper surface of the valve part 82 and which has a collar 106 inserted into the spring 84 to somewhat compress the spring 84 to produce a tension. A snap ring 102 is held on the top end of the spring 84 and the O-ring 96 is attached to the circular groove 98 at the upper base part of the threaded part 94.

Figure 9:
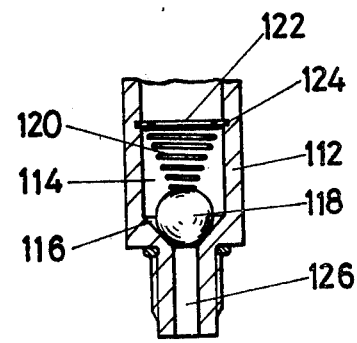
FIGS. 9 and 10 are sectional views showing principal parts of a third embodiment of the present invention.
Figure 10:
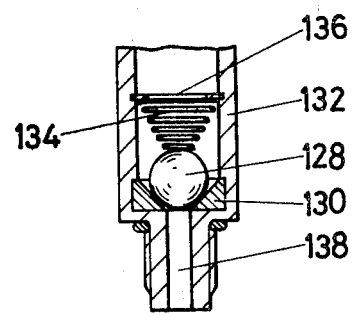

With reference to the third embodiment of the present invention, as it is shown in FIG. 9 with the construction of the cylinder body 112 not substantially different from those of the first and the second embodiments, however, there are variations in the structure of the check valve and the vent system from the foregoing two embodiments. The mechanism of the check valve has a rubber ball 118, which is shaped corresponding to the shape of a valve seat 116 which is disposed at the bottom of an exhaust passage 114, is inserted and, on the upper surface of the ball 118, a spring 120 is supported by a snap ring 122 with the ball 118 being pressed down and the snap ring 122 fitting into a circular groove 124 located on the inside circumferential wall of the cylinder body 112, and thereby, the vent hole 126 itself performs the same function as the vent passage of the check valve which is described in the first and the second embodiments. In the embodiment as shown in FIG. 10 the ball 128 is made of steel and a rubber packing 130 which is a spherical surface attached to the part of the valve seat so as to correspond to the shape of the ball 128.

Figure 11:
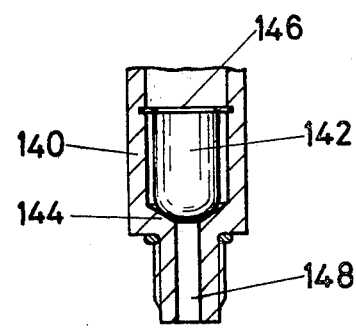
FIG. 11 is a sectional view showing the principal part of a fourth embodiment.

As for the fourth embodiment, it is as shown in FIG. 11 and the construction of the cylinder body 140 is not different from that of the previous described embodiment. The present embodiment has a construction in common with the third practical embodiment, however, without employing any springs, a resilient rubber valve 142, which serves both as a check valve mechanism and as a spring mechanism fits in a valve part 144 and a snap ring 146 is held on the top surface of the said valve 142 by the walls of the cylinder body for somewhat compressing the valve part 144 so that no shaft part as shown in the first and the second practical embodiments is inserted into a vent passage 148. The vent passage 148 itself operates in the same way as in the third embodiment as well as the vent passage which is shown in the first and the second embodiments. The embodiment of the detector for the top dead center position of the present invention is basically as described above.

In the present invention the use of a signal means for the termination point in the detecting for the top dead center position is required. It has already been explained that the detecting by sound is convenient, so that the detector 60 can be provided with a conventional whistle 40 located within it. Accordingly, an example whereby the operation of the whistle as a reporting whistle can be improved is discussed herein below.

The object of the reporting whistle in the present invention is to provide an indication of the termination point of the detecting process for the detecting of the top dead center position by hearing the sound of the said whistle which is produced by utilizing a flow of a compressed air which is exhausted from an automobile cylinder, however, the flow of the compressed air differs greatly depending on a difference in a displacement and the number of revolutions of an engine. Consequently, it becomes necessary that the reporting whistle responds to a comparatively wide range of flow speeds, from a low speed to a high speed, but, as known by past experience, a conventional whistle does not exhibit such properties and therefore, a reporting whistle which can respond to the variable flow speeds of a wide range discussed is described below.

The reporting whistle in the present invention is, as shown in FIGS. 7 and 8, made-up of the following elements. At the upper portion of the exhaust passage 90 of the cylinder body 88, there are arranged three circular plates 150, a snap ring 152 and collars 154, 156 and 158 each one differing in height from a tall to a medium and to a short size. At the center of each of these three plates 150 there are vent holes 160 respectively. For constructing the said reporting whistle, a collar 162 is inserted towards the snap ring 102 which is supported on the top surface of the spring 84 which has previously been described. A snap ring 164 is held on the top surface of the said collar 162 with a stepped part located thereon and the tall collar 154 of the described three kinds of collars, is inserted to be supported on the top surface of the snap ring 164 and then, the plate 150 which has the vent hole 160 is fitted onto the top surface of the collar 154 and, further, the collar 156 having a medium height, is inserted so as to be on the top surface of the described plate 150. Another plate 150 is fitted on the collar 156 and the short collar 158 is inserted and supported on the top surface of the described plate 150 with the snap ring 152 fitted onto the top surface of the said plate 150. The snap ring 152 is received into the circular groove 104 which is located at the uppermost part of the inside circumferential wall of the cylinder body 88. Additionally, an upper air chamber 166 and a lower air chamber 168 are located one on top of the other and defined by the three pieces of the plate 150 and the two pieces of the medium and the short collars 156 and 158, with the center plate 150 making up a border line therebetween with the volume of the lower air chamber 168 being larger than that of the upper air chamber 166.

From results encountered during experimentation, it is advisable to have the volume of the lower air chamber 168 to be about 1.5 times as large as that of the upper air chamber. The size of the vent hole 160 located in the plate 150 and the size of the upper and the lower chambers 166 and 168 are formed so that if the flow speed is high, they are large and if it is low, they are small. Further, the reporting whistle can be arranged as a single unit by providing a partition wall inside the cylinder instead of providing the three pieces of the plate 150 and the two pieces of the collars 156 and 158.

Figure 12:
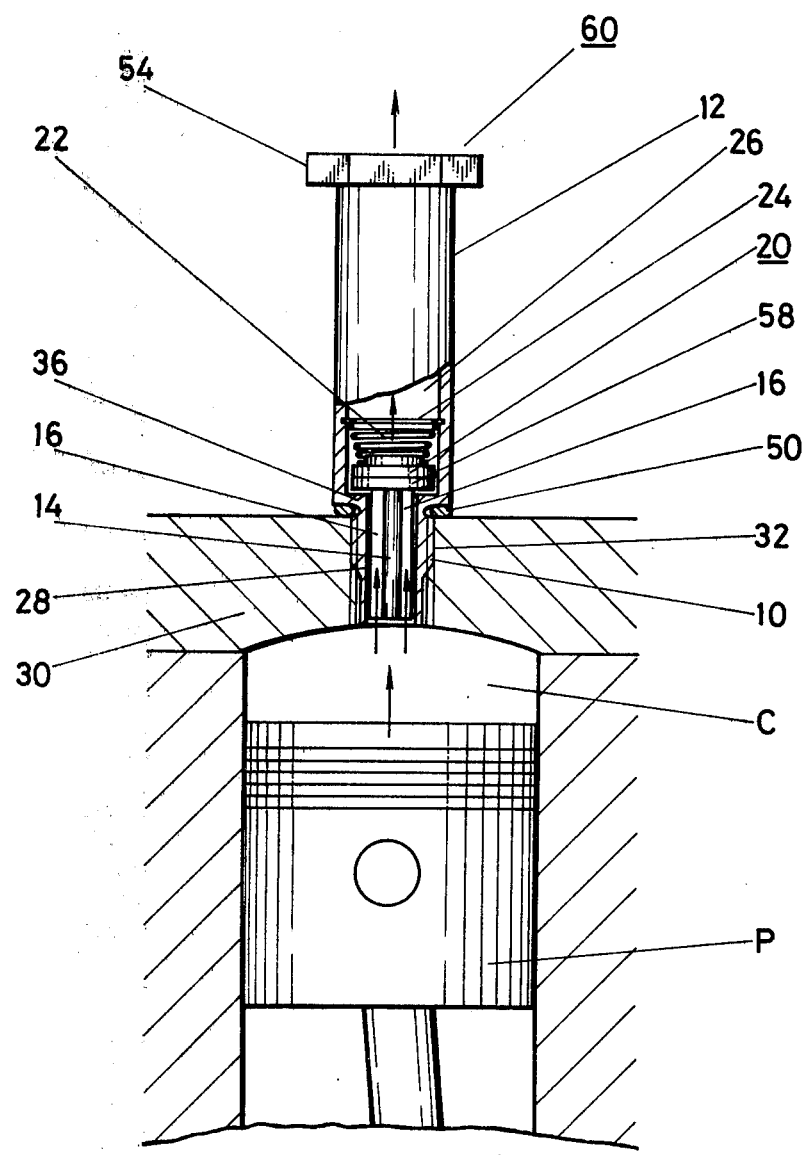
FIG. 12 is a sectional view showing the device of the first embodiment in use.

The construction of the reporting whistle in the present invention is as described above. The operation of the present invention will be described according to the first embodiment with reference to FIG. 12.

First, an explanation will be made for a 4-cylinder engine wherein an ignition is performed in the order of the first, the third, the fourth and the second cylinders. For an engine such as described above, each of the ignition plugs of each cylinder are removed and the threaded part 10 of the detector 60 for finding the top dead center position is inserted into the threaded hole 32 which is normally used for inserting the ignition plug of the first cylinder C and the other cylinders or i.e., the third, the fourth and the second cylinders are left open. In this condition, when the piston P of the first cylinder C ascends when the starter switch of the vehicle is momentarily and intermittently actuated several times, the compressed air produced within the first cylinder C ascends through the vent passage 16 around the shaft part 14 which is inserted into the vent passage 28 while the piston ascends and then escapes into the exhaust passage 26 with the check valve 20 being forced up so that the piston P ascends to the top dead center position and, subsequent to this, the crank shaft exerts above to push down the piston P of the first cylinder from top dead center due to its continuing revolution which is caused by inertia, however, since airtightness is maintained by closing the check valve 20 after the compressed air produced within the first cylinder C is exhausted out by the pushing up the check valve 20, a negative pressure is created within the first cylinder C when the piston P of the said first cylinder is even slightly moved downward, therefore, due to the force exerted by negative pressure, the piston P of the first cylinder C stops and returns to the top dead center position. In this way, the top dead center position is detected and, with the piston P of the first cylinder C at the top dead center, an adjustment of the valve clearance can be done for the air inlet and exhaust valves of the first cylinder C, the exhaust valve of the third cylinder and the air inlet valve of the second cylinder.

Furthermore, in the case the whistle is inserted into the exhaust passage 26 of the detector 60 for the top dead center position, the compressed air ascends via the vent passage 16 of the shaft 14 which is inserted into the vent passage 28 and escapes into the exhaust passage 26 by forcing up the check valve 20 and, further, is exhausted out to atmosphere by passing through the whistle, and thereby, the reporting sound for the termination point of the detecting for the top dead center position can be known by perceiving the sound produced by the whistle and the cessation of the sound when the piston has reached top dead center.

Furthermore, removing the detector 60 for the top dead center position which is attached to the threaded hole 32 which is used for inserting the ignition plug of the first cylinder C allows for attaching it to the threaded hole of the fourth cylinder and, then, the first, the second and the third cylinders are left open to the atmosphere. In the case of the fourth cylinder, when the starter switch is momentarily and intermittently actuated several times just as previously described, the piston of the fourth cylinder stops at the top dead center and then, the adjustment of the air inlet valve of the third cylinder, the air inlet and the exhaust valves of the fourth cylinder and the exhaust valve of the second cylinder is performed so that all exhaust and the air inlet valves have been adjusted. Further, in the case where the ignition is performed in order of the first, the second, the fourth and the third cylinders for the 4-cylinder engine, the top dead center can be adjusted by attaching the detector 60 for the top dead center to the first and the fourth cylinders.

Next, an explanation shall be made for use in a 6-cylinder engine wherein the ignition is performed in order of the first, the fifth, the third, the sixth, the second and the fourth cylinders. For an engine of this type as described previously, wherein all the ignition plugs of each cylinder is removed, the detector 60 for the top dead center position is attached to the threaded hole 32 which is normally used for inserting the ignition plug of the first cylinder and a plug is also attached to the threaded hole of the fifth cylinder and then, the third, the sixth, the second and the fourth cylinders are left open to atmosphere without anything attached thereto.

The starter switch is then actuated momentarily and intermittently several times, the piston of the first cylinder ascends so that, as the piston ascends, the compressed air produced within the first cylinder forces the check valve up. The piston of the first cylinder reaches the top dead center and is pushed down from the top dead center by a further revolution of the crank shaft but is then, however, stopped by the negative pressure which is produced within the first cylinder by the check valve 20 which then seats itself in the valve seat 36. As the first cylinder piston is pushed down, the fifth cylinder piston enters the compression stroke, but since the said fifth cylinder is closed tightly by the blind stopper, there is produced a great resistance on account of the air within the fifth cylinder which is compressed by the piston. Consequently, the first cylinder piston returns to the top dead center and stops due to the negative pressure force of the first cylinder and the resistance which is caused by the compression in the fifth cylinder. The adjustment of the valve clearance of each cylinder is performed in the condition under which the first cylinder stops and then, the adjustment for the air inlet and the exhaust valves of the first cylinder, the exhaust valve of the fifth and the third cylinders, the air inlet valve of the second and the fourth cylinders is performed.

The detector 60 for the top dead center position of the first cylinder and the plug of the fifth cylinder are then removed, the detector and the plug are respectively attached to the sixth cylinder and the second cylinder and, the sixth cylinder piston is stopped at top dead center by momentarily and intermittently actuating the starter switch several times. In this instance, the sixth cylinder piston stops at top dead center with the negative pressure force generated within the sixth cylinder and, also, with the resistance caused by the compression within the second cylinder. With the sixth cylinder piston at the top dead center, the adjustment of the valve clearance of the air inlet and the exhaust valves of the sixth cylinder, the air inlet valve of the fifth and the third cylinders and the exhaust valve of the second and the fourth cylinders is performed so that the adjustment of all the valve clearance is completed. In the case of the 6-cylinder engine wherein the ignition is done in order of the first, the fourth, the second, the sixth, the third and the fifth cylinders, the detector 60 for the top dead center position and the plug are respectively attached to the first and the fourth cylinders and, by causing the piston to ascend by the starter switch being actuated momentarily and intermittently several times, the first cylinder piston stops at the top dead center with the negative pressure force produced within the first cylinder and the resistance force caused by the compression of the fourth cylinder.

After, having the detector 50 for the top dead center position and the plug respectively attached to the sixth and the third cylinders, the starter switch is actuated momentarily and intermittently several times so that the sixth cylinder piston stops at the top dead center by means of the negative pressure force generated within the sixth cylinder and the resistance force caused by the compression of the third cylinder. The plug is attached to the cylinder which continually enters the compression stroke and which stops the piston at the top dead center, further, the plug can be also used similarly in the case of a 4-cylinder engine.

Figure 13:
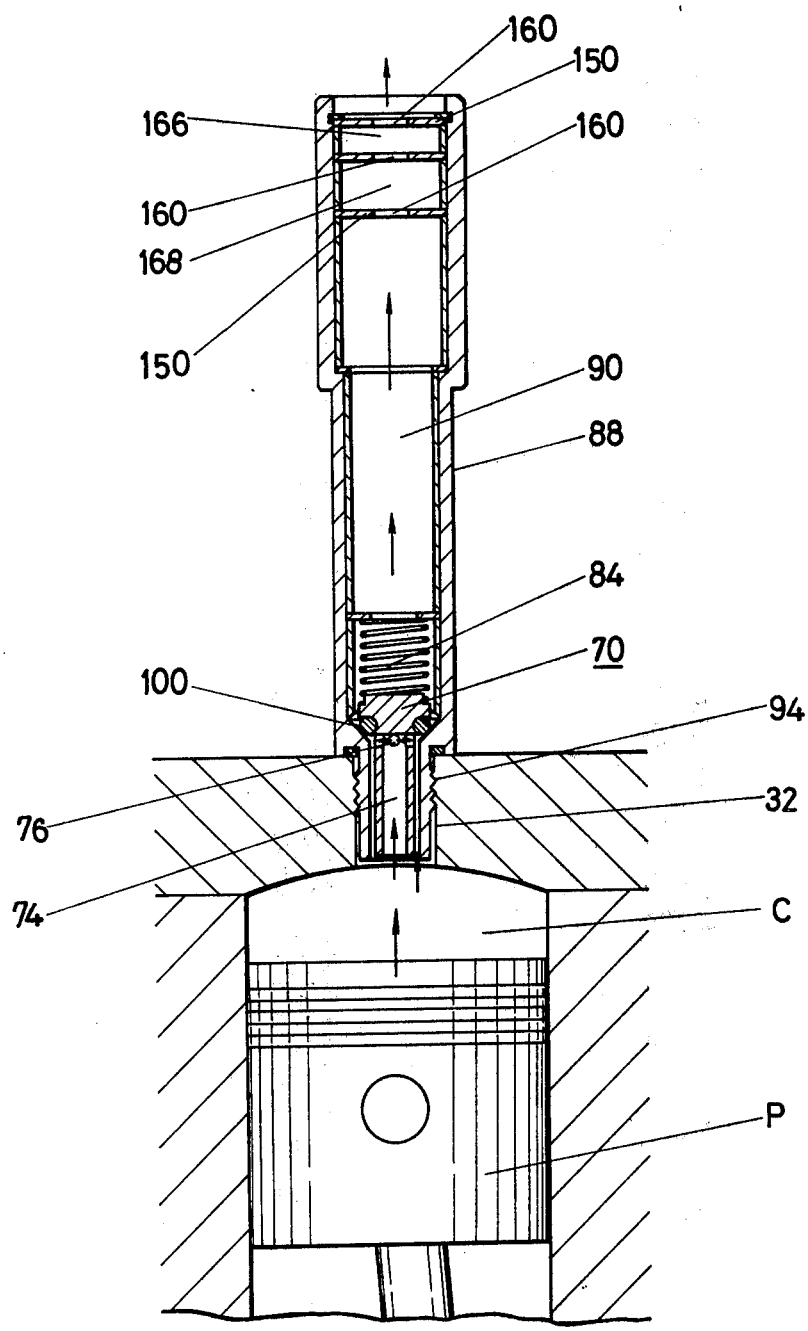
FIG. 13 is a sectional view showing the device of the second embodiment in use.

Next, referring to FIG. 13 an explanation shall be made for the function of the reporting whistle when it is installed within the exhaust passage 90 of the detector for the top dead center position in the present invention.

When the threaded part 94 of the detector for the top dead center position attached to the screw hole 32, the remaining holes which are for use for inserting the plugs as previously described are left open to the atmosphere. Under this condition, when the piston P of the cylinder C ascends when the starter switch of the vehicle actuated momentarily and intermittently several times, the pressure of the compressed air generated within the cylinder C forces the check valve 70 upward as the piston P ascends, the check valve 70 overcomes the elastic force of the spring 84 so that the compressed air is exhausted out into the exhaust passage 90 via a gap which is formed along the vent passage 74, the branched passage 76 and the valve seat 100. The described compressed air flows into the lower air chamber 168 from the vent hole 160 which is located in the plate 150 of the reporting whistle and flows in eddy currents within the lower air chamber 168. Further, it also flows in eddy currents within the upper air chamber 166 after flowing into the said upper air chamber 166 through the vent hole 160 which is located in the middle plate 150 and, finally, it is exhausted out to the atmosphere through the vent hole 160 located in the upper plate 150. The sound is produced by creating the eddy currents within the lower and the upper air chambers 168 and 166. When the flow speed of the compressed air which exhausted from the cylinder C is high, a loud sound is produced by creating eddy currents within the lower air chamber 168 which has a large volume and, further, producing the eddy currents when passing through the upper air chamber 166 and exhausting the air out to atmosphere with an accompanying loud sound resulting.

When the flow speed of the compressed air is low, an audible sound can not be produced although the eddy currents are formed within the lower air chamber 168, because of its large volume, however, when the air having the low flow speed flows into the upper air chamber 166 which has a small volume to create the eddy currents, an audible sound can be produced. Furthermore, in the embodiment just described, the compressed air flows along the side walls of the lower air chamber 168 of the large volume, however, if the compressed air is made to flow into and along the side walls of the upper air chamber 166 having the small volume, the air which flows into the upper air chamber 166 produces, in the case of a very high flow speed, eddy currents because of its high flow speed. However, most of the air advances straight through the large chamber because of its high velocity and does not flow in eddy currents which produce the sound. Although most of the air advancing straight through flows into the large lower air chamber 168, it is exhausted out to atmosphere without forming any eddy currents which produce the audible sound. Specifically, the air passing through the vent hole 160 of the plate 150 is flowing in condition such as if it were being blown through a small tube and, in this case, it is difficult to form the eddy currents within the lower air chamber 168 to produce the sound. Accordingly, as long as the air passing through the vent hole 160 does not scatter within the lower air chamber 168 it becomes difficult to form eddy currents to produce the sound and, in the case of a high flow speed, it is difficult to obtain a good result for producing the sound with the air flow from the upper air chamber 166 which has a small volume. Therefore, it is better to assemble these air chambers within the cylinder body 88 so that the compressed air flows along side of the large lower air chamber 168. Further, the two air chambers are employed in the embodiment just described above, but without being limited to having only two air chambers, a number of air chambers, for example, three or four, can be employed provided that the volume of the air chambers vary between themselves which allows for great variations in flow speeds.

I claim:

1. A detector for detecting when a piston, which is movable in a cylinder of a motor vehicle engine with the cylinder having a threaded opening therein for receiving an ignition plug, is at top dead center position, said detector comprising:

a cylindrical body having an opening at the top portion thereof and an opening at the lower portion thereof said body having a passage therethrough having a large internal diameter at the upper portion and a small internal diameter, relative to said large diameter, at the lower portion, said body having threads on the outside around the lower portion thereof for being screwed into the ignition plug opening of a cylinder of an engine; and valve means including, (a) a check valve having a downwardly protruding shaft, said shaft having a square cross-section and a bore which extends through the center along the length thereof and branching into openings on each respective surface of said shaft at the point where said shaft is attached to said check valve, said bore and branched openings defining a vent passage within said smaller diameter portion of said cylinder body passage, (b) a valve seat located within said cylinder body passage between said smaller and larger diameter portions for cooperating with said check valve for closing off the passage between said openings at the ends of said cylinder body, (c) a valve top part mounted on the top surface of said check valve, and (d) spring means having securing means for securing said spring means in position in said large internal diameter portion and positioned for engaging said valve top part for exerting a predetermined amount of force on said check valve for maintaining said valve means closed, said valve means mounted within said cylindrical body at a location between said large diameter portion and said small diameter portion, said valve means opening for allowing air to be exhausted through said cylinder body from the cylinder on which the detector is being used, as the piston moves to top dead center position in the cylinder, and said valve means closing once the piston in the cylinder has reached the top dead center position for preventing flow therethrough from the larger diameter portion to the smaller diameter portion and for creating and maintaining a vacuum as said piston begins to move away from top dead center position for maintaining the piston at top dead center position, whereby the top dead center position of the piston can be detected.

2. A detector as claimed in claim 1 further comprising:

a whistle mounted within the upper part of said large diameter portion of said cylinder body passage for emitting audible sounds for audibly indicating the top dead center position of the piston.

3. A detector as claimed in claim 2 wherein said whistle further comprises:

a plurality of chambers having varying volumes and communicating with each other for being caused to emit audible sounds by air passing therethrough, said air having differing velocities and one of said chambers being caused to emit said sound according to the velocity of said air passing through.

* * * * *